United States Patent Office
3,423,455
Patented Jan. 21, 1969

3,423,455
CATALYTIC OXIDATION OF PROPYLENE TO ACETIC ACID
Robert M. Dobres, Silver Spring, R. Parthasarathy, Takoma Park, and John L. Warthen, Baltimore, Md., assignors to W. R. Grace & Co., New York, N.Y., a corporation of Connecticut
No Drawing. Filed July 21, 1965, Ser. No. 473,837
U.S. Cl. 260—533
Int. Cl. C07c 51/32
8 Claims

ABSTRACT OF THE DISCLOSURE

Acetic acid is prepared by reacting propylene with oxygen in the presence of a catalyst. The catalyst consists essentially of (a) a porous inert metal oxide and (b) from 10 to 90 percent, based on the total weight of the catalyst, of a compound represented by the formula:

$$XP_2O_5:YMoO_3$$

where the ratio of X:Y lies within the range of 1:5 to 1:40. The catalyst has a surface area within the range of 5 to 80 m.$^2$/g. Preferably the inert metal oxide is silica gel. Also, preferably, the reactants are in the gaseous state. The reaction can be conducted in either a fixed-bed or fluidized-bed reactor.

---

This invention relates to the oxidation of unsaturated hydrocarbons to form the corresponding acids. In particular, this invention relates to a process for forming carboxylic acids from unsaturated hydrocarbons using an improved catalyst. This invention has particular advantages in the production of acetic acid from propylene.

In summary, the process of this invention is a method for the manufacture of acetic acid from propylene comprising reacting propylene with oxygen in the presence of a catalyst consisting essentially of a porous inert metal oxide and from 10 to 90 percent based on the weight of the catalyst, of a compound represented by the formula $XP_2O_5:YMoO_3$ wherein the ratio of X:Y is within the range of from 1:5 to 1:40, and the catalyst has a surface area within the range of from 5 to 80 m.$^2$/g.

It is an object of this invention to provide a process for oxidizing olefins to form the corresponding carboxylic acids employing a superior catalyst.

It is another object of this invention to provide a method for oxidizing propylene to acetic acid employing a catalyst which provides greater activity and selectivity for the production of acetic acid.

In general, the process of this invention is carried out by contacting a gaseous mixture containing an olefin and oxygen with a catalyst to form the corresponding carboxylic acid.

The process of this invention is applicable to the oxidation of a wide variety of olefins such as propylene, normal and isobutenes, and higher molecular weight homologs thereof to form the corresponding carboxylic acids. This process is particularly applicable to the oxidation of propylene to form acetic acid.

A gaseous mixture containing oxygen and the olefin to be oxidized is contacted with the catalyst. Air or other oxygen-containing gases can be employed as the oxygen source. If the olefin is propylene, the propylene concentration in the feed mixture should be from 1 to 20 mole percent propylene, and the oxygen to propylene mole ratio should be within the range of from 0.25 to 10:1. The remainder of the gas stream can comprise saturated hydrocarbons and inert diluent gases such as nitrogen and the like. For example, a gaseous mixture containing propylene, propane, and air can be employed as a feed in the process.

In a preferred embodiment of this invention, the gaseous feed contains steam. If the olefin in propylene, the water to propylene mole ratio should be within the range of from 1 to 20:1. The function of the steam is not clearly understood. It apparently acts as a moderator, increasing the selectivity of the catalyst to produce particular products.

The gaseous feed mixture can be contacted with the catalyst in either a fixed bed or a fluidized bed system. If a fixed bed reactor is to be employed, the catalyst is preferably in the form of pellets, pills, balls, extrudates, and the like having a size within the range of from 5 to 25 mesh (U.S. Sieve). For fluidized bed reaction systems, the catalyst can have a particle size within the range of from 10 to 200 microns and preferably within the range of from 50 to 100 microns.

The products of this reaction include carbon monoxide, carbon dioxide, the respective carboxylic acid, small amounts of acrylic acid, acrolein, acetaldehyde, acetone, formaldehyde and ethylene, together with any unoxidized olefin. The carboxylic acid product can be recovered from the reactor effluent gases by conventional methods such as condensation, scrubbing with water or other suitable solvents, or compression followed by the subsequent expansion.

The catalyst employed in the process of this invention comprises the porous inert oxide and from 10 to 90 percent, based on the weight of the catalyst, of a compound represented by the formula $XP_2O_5:YMoO_3$ wherein the ratio of X:Y is within the range of from 1:5 to 1:40. The catalyst preferably contains from 20 to 80 percent of the compound represented by the above formula, and the ratio of X:Y is preferably within the range of from 1:10 to 1:30. The catalyst should have a surface area within the range of from 5 to 80 m.$^2$/g. and preferably within the range of from 10 to 40 m.$^2$/g. to provide the requisite activity and selectivity for oxidizing propylene to acetic acid. Surface areas below this range do not provide the requisite activity and selectivity. Surface areas above this range provide increased activity, but the selectivity for the production of acetic acid from propylene is seriously diminished.

The porous inert oxide can be silica, alumina, titania, zirconia, and the like. Preferably the metal oxide is silica.

The catalyst employed in the process of this invention can be formed by several techniques. Phosphomolybdic acid can be incorporated on or in the inert metal oxide component by either impregnation or cogelation. Formation of the catalyst by cogelation is preferred since the catalyst formed by this method has been found to provide the best selectivity and activity. Formation of the catalyst by cogelation provides a product having a greater degree of homogeneity than the impregnated catalyst.

The phosphorous and molybdenum source employed in the formation of the catalyst can be either a solution of phosphomolybdic acid in water having the desired phosphorous to molybdenum ratio or the ammonium salts thereof. Also, the aqueous solution can be formed by mixing phosphoric acid and ammonium molybdate in the desired proportions to provide the desired ratio in the final catalyst. When a silica cogel is to be formed, the silica source is preferably the silica sol. Any conventional commercially available silica sol can be employed. The phosphomolybdic acid or salt solution and the silica sol are mixed and stirred while ammonium hydroxide is added to adjust the pH up to about 6.5. The resulting sol is permitted to gel and is then dried at 220° F.

The catalyst of this invention can also be formed by multiple impregnation of a porous support having sufficient porosity to provide the final surface area desired, such as a suitable silica gel.

After the phosphomolybdic acid-inert metal oxide composite is formed, it is activated by calcining at about 1000° F. The calcination is thought to at least partially convert the phosphomolybdic acid component to the respective phosphorous and molybdenum oxides. The formula $XP_2O_5:YMoO_3$ is employed herein to represent the product formed by calcination of the phosphomolybic acid at elevated temperatures.

The temperature at which the reaction is to be conducted should be within the range of from 650 to 900° F. and preferably from about 700 to 850° F. For the production of acetic acid from propylene, a temperature of about 740° F. appears to be optimum.

The reaction is normally carried out at atmospheric pressure. However, gas pressures within the range of from 0.5 to 10 atmospheres can be employed.

The contact time of the gaseous mixture with the catalyst is important. One conventional measure of contact time is apparent contact time which is calculated by dividing the volume of catalyst in the reactor by the volume of gaseous feed per unit of time. An apparent contact time of from 1 to 20 seconds can be used, an apparent contact time of from 3 to 10 seconds being preferred. This corresponds approximately to a gas hourly space velocity (GHSV) at standard temperatures and pressures of from about 4000 to 200 and from about 1200 to 360 volumes of feed per hour per volume of catalyst respectively.

The invention is further illustrated by the following specific but non-limiting examples.

Example 1

This example shows a phosphomolybdic oxide-silica gel catalyst having a phosphorous oxide to molybdenum oxide mole ratio of 1:20 and containing 70% of the phosphorous and molybdenum oxides, expressed as phosphomolybdic acid.

The catalyst was formed by mixing a solution of phosphomolybdic acid having the formula $$20MoO_3 \cdot 2H_3PO_4 \cdot 48H_2O$$

in water with a 26 millimicron silica sol containing 48% silica. The phosphomolybdic acid solution was added in a quantity sufficient to provide 70% phosphomolybdic acid based on the combined weight of the phosphomolybdic acid and silica. The mixture was stirred while adding ammonium hydroxide until a pH of 6.5 was obtained. The resulting sol was permitted to gel and was dried at 220° F. The gel composite was then calcined at 1000° F. The surface area of the calcined gel was found to be 18 m.$^2$/g.

The catalyst was screened to separate the portion having a size within the range of from 14 to 24 mesh, and 100 cc. of the catalyst having the desired size was introduced into the aluminized reactor. A 5% propylene, 50% air, and 45% steam mixture (volume percent) was passed through the catalyst at atmospheric pressure in a series of runs at varying temperatures and feed rates. Analysis of the effluent product gave the results shown in Table A.

TABLE A

| Run No. | Temp., °F | GHSV [1] | Contact time, sec. | Conversion, percent | Selectivity [2] for acetic acid, percent |
|---|---|---|---|---|---|
| 1 | 738 | 500 | 7.2 | 62.4 | 73.8 |
| 2 | 769 | 500 | 7.2 | 66.9 | 62.4 |
| 3 | 793 | 500 | 7.2 | 69.5 | 50.9 |
| 4 | 744 | 1000 | 3.6 | 44.0 | 67.7 |

[1] Volume of feed per hour per volume of catalyst.
[2] Acetic acid yield based on converted propylene.

Example 2

The catalyst was formed by mixing a solution of phosphomolybdic acid having the formula $$20MoO_3 \cdot 2H_3PO_4 \cdot 48H_2O$$

in water with a silica sol containing 15% silica. The phosphomolybdic acid solution was added in a quantity sufficient to provide 70% phosphomolybdic acid based on the combined weight of the phosphomolybdic acid and silica. The mixture was heated to 135° F. for one hour and was then dried at 220° F. The composite was then calcined at 1000° F. The surface area of the calcined material was found to be 23 m.$^2$/g. The catalyst was tested as described in Example 1, and the results are shown in Table B.

TABLE B

| Run No. | Temp., °F. | GHSV | Contact time, sec. | Conversion, percent | Selectivity for acetic acid, percent |
|---|---|---|---|---|---|
| 5 | 730 | 1000 | 3.6 | 43 | 61.4 |
| 6 | 738 | 2000 | 1.8 | 24.6 | 51.9 |
| 7 | 805 | 1000 | 3.6 | 37.8 | 45.2 |

Example 3

The catalyst was formed by mixing a solution of phosphomolybdic acid having the formula $$12MoO_3 \cdot H_3PO_4 \cdot 14H_2O$$

in water to a 26 millimicron silica sol containing 48% silica. The phosphomolybdic acid was added in a quantity sufficient to provide 70% phosphomolybdic acid based on the combined weight of phosphomolybdic acid and silica. The mixture was stirred while adding ammonium hydroxide until a pH of 9.5 was obtained. The resulting sol was permitted to gel and was dried at 220° F. The gel composite was then calcined at 1000° F. The surface area of the calcined material was found to be 18 m.$^2$/g.

The catalyst was then tested as described in Example 1, and the results obtained are shown in Table C.

TABLE C

| Run No. | Temp., °F. | GHSV | Contact time, sec. | Conversion, percent | Selectivity for acetic acid, percent |
|---|---|---|---|---|---|
| 8 | 740 | 500 | 7.2 | 59.9 | 66.1 |
| 9 | 789 | 500 | 7.2 | 70.5 | 45.6 |
| 10 | 789 | 1000 | 3.6 | 60.5 | 50.5 |

Example 4

The catalyst was formed by impregnating a silice gel base in the form of ⅛ in. x ⅛ in. pills with an aqueous solution of phosphomolybdic acid having the formula $20 \cdot MoO_3 \cdot 2H_3PO_4 \cdot 4H_2O$. The phosphomolybdic acid solution was impregnated in a quantity sufficient to provide 20% phosphomolybdic acid based on the combined weight of phosphomolybdic acid and silica gel. The composite was dried at 220° F. and calcined at 1000° F. The surface area of the calcined material was found to be 23 m.$^2$/g.

Propylene, air, and steam were contacted with a bed of this catalyst as described in Example 1, and the results are shown in Table D as Runs 11 and 12.

Example 5

The catalyst was formed by the procedure of Example 1 with the following exception. The phosphomolybdic acid, $20 \cdot MoO_3 \cdot 2 \cdot H_3PO_4 \cdot 48H_2O$, was added in a quantity sufficient to provide 50% phosphomolybdic acid based on the combined weight of the phosphomolybdic acid and silica. The surface area of the calcined material was 41 m.$^2$/g.

A propylene, air, and steam mixture was contacted with a bed of the catalyst as described in Example 1.

The results obtained are shown in Table D as Runs 13 and 14.

TABLE D

| Run No. | Temp., °F. | GHSV | Contact time, sec. | Conversion, percent | Selectivity for acetic acid, percent |
|---|---|---|---|---|---|
| 11 | 743 | 500 | 7.2 | 29.3 | 53.1 |
| 12 | 809 | 500 | 7.2 | 37.2 | 42.6 |
| 13 | 744 | 500 | 7.2 | 28.7 | 51.2 |
| 14 | 786 | 500 | 7.2 | 42.9 | 49.7 |

Example 6

The catalyst was formed by the procedure described in Example 1 with the following exception. The phosphomolybdic acid, $20MoO_2 \cdot 2H_3PO_4 \cdot 48H_2O$, was added in a quantity sufficient to provide 80% phosphomolybdic acid based on the combined weight of the phosphomolybdic acid and silica. The surface area of the calcined material was 19 m.²/g.

Propylene, air and steam was contacted with a bed of this catalyst as described in Example 1, and the results obtained are shown in Table E.

TABLE E

| Run No. | Temp., °F. | GHSV | Contact time, sec. | Conversion, percent | Selectivity for acetic acid, percent |
|---|---|---|---|---|---|
| 15 | 734 | 500 | 7.2 | 56.7 | 62.3 |
| 16 | 777 | 500 | 7.2 | 63.9 | 55.9 |

Example 7

Propylene-propane mixtures with steam and air were contacted with a bed of catalyst as described in Example 6, and the results obtained are shown in Table F.

TABLE F

| Run No. | Temp., °F. | GHSV | Contact time, sec. | Conversion, percent | Selectivity for acetic acid, percent |
|---|---|---|---|---|---|
| 17 | 737 | 500 | 7.2 | 38.7 | 50 |
| 18 | 781 | 500 | 7.2 | 46.5 | 46 |

Obviously many modifications and variations of the invention as hereinabove set forth may be made without departing from the essence and scope thereof, and only such limitations should be applied as are indicated in the claims.

We claim:
1. A process for the manufacture of acetic acid from propylene comprising reacting propylene with oxygen in the presence of a catalyst consisting essentially of a porous inert metal oxide and from 10 to 90%, based on the weight of the catalyst, of a compound represented by the formula $XP_2O_5:YMoO_3$, wherein the ratio of X:Y is within the range of from 1:5 to 1:40, and the catalyst has a surface area within the range of from 5 to 80 m.²/g.

2. The process of claim 1 wherein the ratio of X:Y is within the range of from 1:10 to 1:30.

3. The process of claim 1 wherein the inert metal oxide is silica gel.

4. The process of claim 1 wherein the reaction is conducted in a fixed bed reactor containing a bed of granular catalysts.

5. The process of claim 1 wherein the reaction is conducted in a fluidized bed reactor containing a bed of fluidized catalyst.

6. A process for the manufacture of acetic acid comprising contacting a gaseous mixture containing propylene and oxygen with a catalyst consisting essentially of a porous inert metal oxide and from 10 to 90%, based on the weight of the catalyst, of a compound represented by the formula $XP_2O_3:YMoO_3$, wherein the ratio of X:Y is within the range of from 1:5 to 1:40 and the catalyst has a surface area within the range of from 5 to 80 m.²/g.

7. The process of claim 6 wherein the gaseous mixture contains air.

8. The process of claim 6 wherein the inert metal oxide is silica gel.

References Cited

UNITED STATES PATENTS

| 3,095,452 | 6/1963 | Callahan et al. | 260—533 |
| 3,293,290 | 12/1966 | Flint et al. | 260—604 |
| 2,941,007 | 6/1960 | Callahan et al. | 260—604 |

LORRAINE A. WEINBERGER, Primary Examiner.

D. STENZEL, Assistant Examiner.

U.S. Cl. X.R.

260—604